United States Patent
Chen et al.

(10) Patent No.: US 7,035,117 B2
(45) Date of Patent: Apr. 25, 2006

(54) EXPANSION CARD MOUNTING APPARATUS

(75) Inventors: Yun Lung Chen, Tu-Chen (TW); DaLong Sun, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/832,756

(22) Filed: Apr. 26, 2004

(65) Prior Publication Data

US 2004/0212975 A1    Oct. 28, 2004

(30) Foreign Application Priority Data

Apr. 25, 2003   (TW) .............................. 92206587 U

(51) Int. Cl.
*H05K 7/12* (2006.01)
(52) U.S. Cl. ...................... 361/801; 361/732; 361/740; 361/747; 361/759; 312/222
(58) Field of Classification Search ................ 361/726, 361/740, 741, 747, 732, 759, 801
See application file for complete search history.

(56) References Cited

U.S. PATENT DOCUMENTS

| | | | |
|---|---|---|---|
| 4,745,524 A | | 5/1988 | Patton, III |
| 5,317,483 A | * | 5/1994 | Swindler ..................... 361/801 |
| 5,694,291 A | * | 12/1997 | Feightner .................... 361/683 |
| 5,936,835 A | | 8/1999 | Astier |
| RE36,695 E | * | 5/2000 | Holt ......................... 312/265.6 |
| 6,173,843 B1 | * | 1/2001 | Christensen et al. ..... 211/41.17 |
| 6,354,547 B1 | * | 3/2002 | Shyr ..................... 248/221.11 |
| 6,487,089 B1 | * | 11/2002 | Otis .......................... 361/796 |
| 6,549,398 B1 | * | 4/2003 | Chen ......................... 361/683 |
| 2004/0037048 A1 | * | 2/2004 | Liao .......................... 361/726 |

* cited by examiner

*Primary Examiner*—Kamand Cuneo
*Assistant Examiner*—Dameon E. Levi
(74) *Attorney, Agent, or Firm*—Wei Te Chung

(57) ABSTRACT

An expansion card mounting apparatus includes a rear panel (10), a pressing body (50) pivotably attached to the rear panel, and two retention members (70) attached to the pressing body. The rear panel defines two retention slots, and includes a support frame supporting slot covers (101) of expansion cards (100). The retention members are received in the retention slots respectively. Each retention member is movable in a corresponding retention slot to drive the pressing body between a locked position in which end portions (101) of the slot covers are sandwiched between the support frame and the pressing body, and a released position in which the end portions are released from the pressing body. The retention member includes a spring arm (76) snappingly engaging in the corresponding retention slot to retain the pressing body in the locked position.

21 Claims, 5 Drawing Sheets

EXPANSION CARD MOUNTING APPARATUS

BACKGROUND OF THE INVENTION

1. Field of the Invention

The present invention relates to mounting apparatuses, and more particularly to a mounting apparatus for readily and securely mounting expansion cards in a computer enclosure.

2. Related Art

Many computer systems comprise not only a motherboard, but also one or more expansion cards electrically connected to the motherboard to provide specialized functions. It is required that the expansion cards be reliably retained within the computer enclosure to prevent disengagement from the motherboard when the computer is subjected to shock and vibration during delivery and use thereof.

U.S. Pat. No. 5,317,483 discloses a mounting apparatus for mounting expansion cards to a computer chassis. The mounting apparatus includes a pressing body having one end pivotably mounted to a support plate of the chassis. After the pressing body is pivoted to a position in which slot covers of the expansion cards are sandwiched between the pressing body and the support plate, the other end of the pressing body is fastened to the support plate with a screw. The expansion cards are thus secured to chassis.

U.S. Pat. No. 5,936,835 discloses another expansion card mounting apparatus. The mounting apparatus has a plurality of spring fingers and a mounting portion. After the mounting apparatus is disposed in a position in which the spring fingers respectively press corresponding slot covers of expansion cards, the mounting portion is screwed to the chassis. The expansion cards are thus secured to the chassis.

Both of the above-mentioned prior art apparatuses can mount a plurality of expansion cards at one time. However, when installing or removing several expansion cards, manipulating the screw is unduly laborious and time-consuming. In addition, a tool such as a screwdriver or a wrench is usually required.

SUMMARY OF THE INVENTION

Accordingly, an object of the present invention is to provide an apparatus for readily and efficiently installing and removing expansion cards to and from equipment such as a chassis of a computer.

To achieve the above-mentioned object, an expansion card mounting apparatus in accordance with a preferred embodiment of the present invention comprises a rear panel, an elongate pressing body pivotably attached to rear panel, and two retention members attached to the pressing body. The rear panel defines two retention slots, and comprises a support frame located below the retention slots, for supporting slot covers of the expansion cards. The retention members are received in the retention slots respectively. Each retention member is movable in a corresponding retention slot to drive the pressing body between a locked position in which end portions of the slot covers are sandwiched between the support frame and the pressing body, and a released position in which the end portions are released from the pressing body. The retention member comprises a spring arm snappingly engaging in the corresponding retention slot to retain the pressing body in the locked position.

Other objects, advantages and novel features of the present invention will be drawn from the following detailed description of the preferred embodiment of the present invention with attached drawings, in which:

DESCRIPTION OF THE PREFERRED EMBODIMENTS

The present invention will be described in its preferred embodiments, and in conjunction with a plurality of expansion cards.

Figure 1:
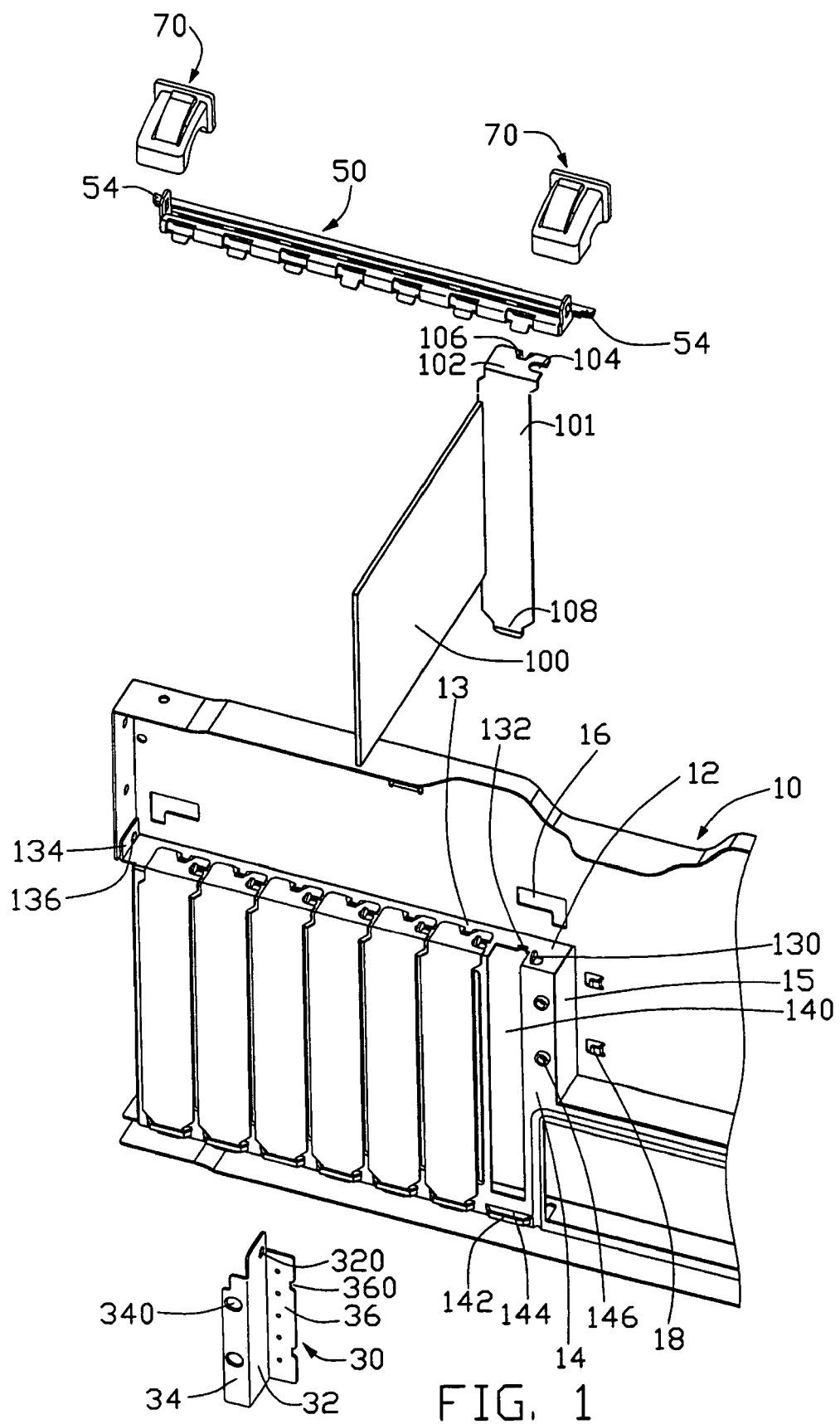
FIG. 1 is an exploded, isometric view of an expansion card mounting apparatus in accordance with the preferred embodiment of the present invention, together with a plurality of expansion cards each having a slot cover, the expansion card mounting apparatus comprising a rear panel, a positioning plate, a pressing body and two retention members.

FIG. 1 shows an expansion card mounting apparatus in accordance with the preferred embodiment of the present invention, together with an expansion card 100 and a plurality of slot covers 101. The mounting apparatus comprises a rear panel 10, a positioning plate 30 fixed to the rear panel 10, a pressing body 50 pivotably attached to the rear panel 10, and two symmetrical retention members 70 attached to the pressing body 50.

The slot covers 101 are attached to ends of respective expansion cards 100. For the sake of simplicity, only one expansion card 100 is illustrated in FIG. 1. Each slot cover 101 comprises a bent end portion 102 defining two cutouts 104, 106 therein, and an insertion end 108 opposite from the bent end portion 102.

The rear panel 10 comprises a support frame 12 at a bottom side portion thereof, for supporting the slot covers 101 of the expansion cards 100 thereon. In the preferred embodiment of the present invention, the support frame 12 is formed by stamping a portion of the rear panel 10 forwardly. The support frame 12 is thus a unitary part of the rear panel 10. Alternatively, the support frame 12 may be a separate component attached to the rear panel 10. The support frame 12 comprises a horizontal top wall 13, a vertical front wall 14, and left and right vertical sidewalls 15 (only the right sidewall 15 can be seen in FIG. 1). The top wall 13 comprises a plurality of sets of positioning tabs 130 and positioning blocks 132. Each set of one positioning tab 130 and one positioning block 132 corresponds to the cutouts 104, 106 of one slot cover 101. An upstanding tab 134 extends from a left end of the top wall 13. A first pivot hole 136 is defined in the upstanding tab 134. A plurality of evenly spaced vertical expansion slots 140 is defined in the front wall 14. A bottom portion of the front wall 14 is stamped forwardly to form a plurality of catches 142, each catch 142 being below a respective expansion slot 140. Each catch 142 cooperates with the front wall 14 to define a positioning hole 144 therebetween, for receiving the insertion end 108 of a corresponding slot cover 101. Two spaced hollow posts 146 extend forwardly from the front wall 14, near the right sidewall 15.

Two spaced, symmetrical retention slots 16 are defined in the rear panel 10, generally above left and right ends of top wall 13 respectively. Each retention slot 16 is L-shaped, and is used for receiving a corresponding retention member 70 therein. Two spaced latches 18 are formed on the rear panel 10, near the right sidewall 15.

The positioning plate 30 is attached to a right side of the support frame 12. The positioning plate 30 comprises two mounting plates 34, 36 interconnected by a connecting plate 32. The mounting plate 34 defines two mounting holes 340 therein, for receiving the hollow posts 146 of the front wall 14 of the support frame 12. The mounting plate 36 defines two notches 360, for engaging receiving the latches 18 of the rear panel 10. The connecting plate 32 defines a second pivot hole 320 in a top portion thereof, for alignment with the first pivot hole 136.

Figure 2:
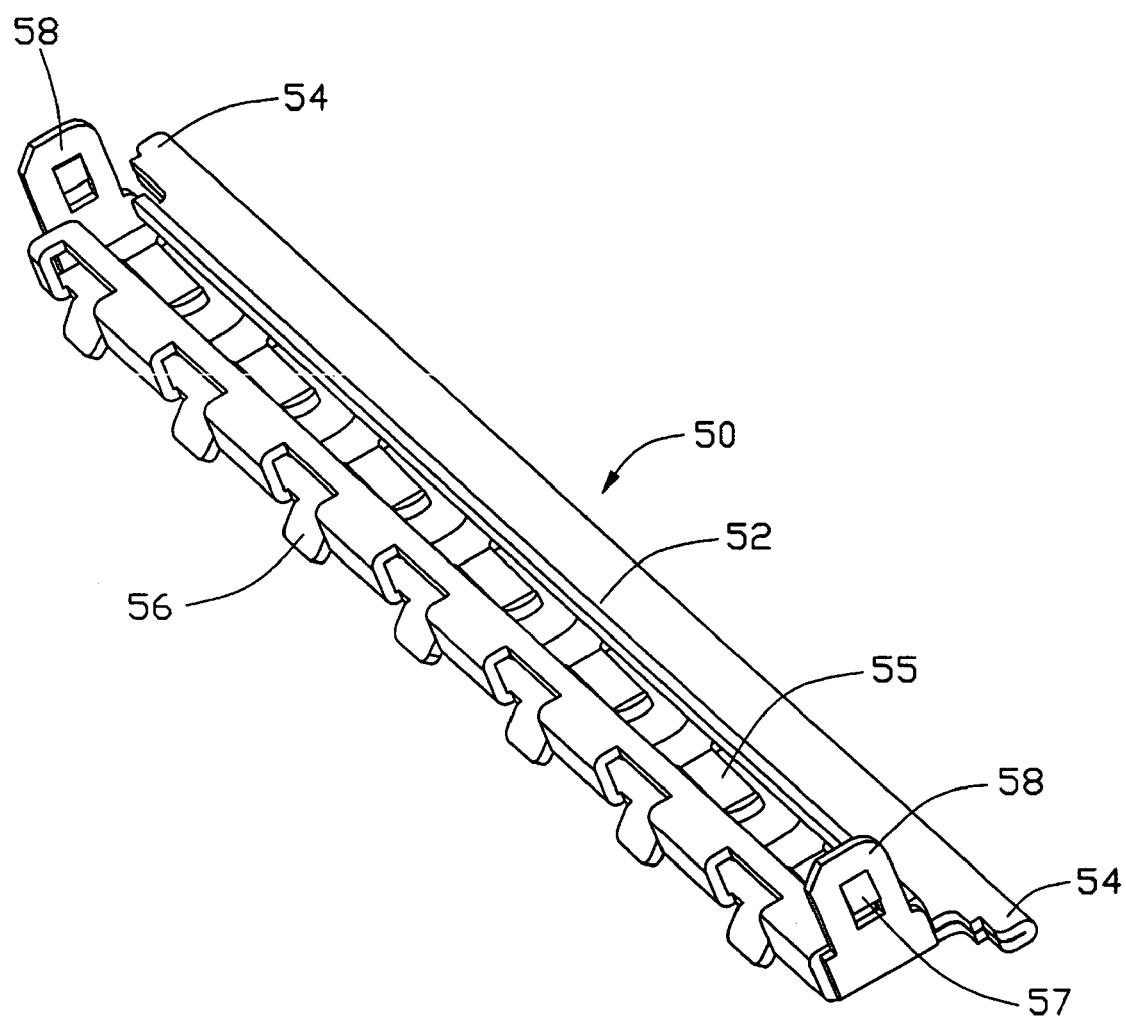
FIG. 2 is an enlarged, isometric view of the pressing body of the mounting apparatus of FIG. 1, but viewed from a slightly different aspect.
Figure 5:
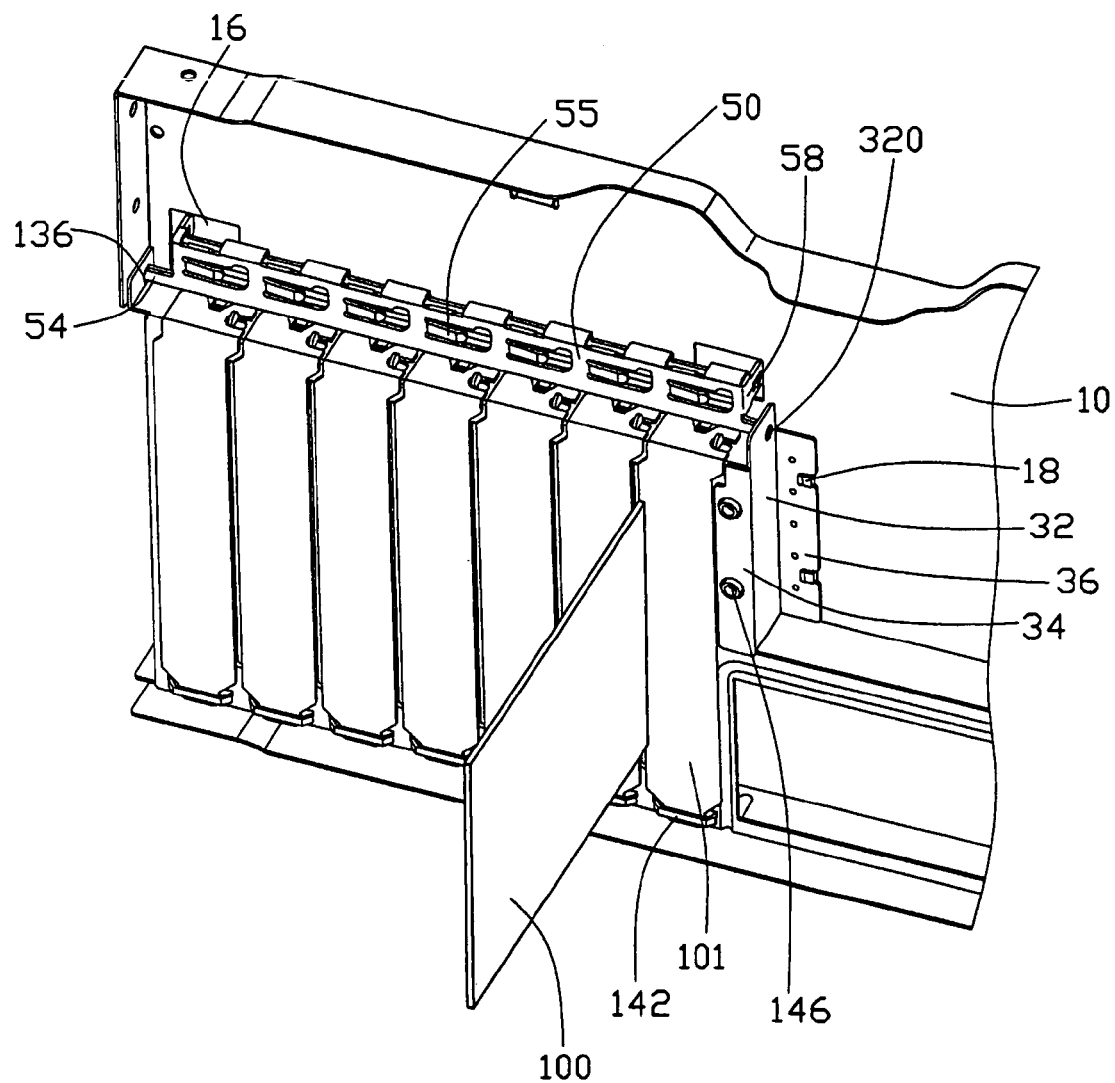
FIG. 5 is an assembled view of FIG. 1, showing the expansion cards in a released state.

Referring also to FIG. 2, the pressing body 50 is elongated and made from resilient sheet material such as plastic. The pressing body 50 comprises a main pressing portion 52, and two connecting arms 58 extending perpendicularly from opposite ends of the pressing portion 52 respectively. A rear edge section of the pressing portion 52 is folded back over itself, thereby forming a two-layer structure thereat. This enhances a mechanical strength of the pressing body 50. The two-layer rear edge section of the pressing portion 52 forms a pair of pivot axles 54 at opposite ends thereof respectively, for being received in the first and second pivot holes 136, 320. Referring also to FIG. 5, a plurality of evenly spaced spring fingers 55 extends at slight angles from the pressing portion 52, for resiliently pressing one or more bent end portions 102 of one or more slot covers 101 respectively. A plurality of evenly spaced lips 56 extends forwardly and downwardly from a front edge of the pressing portion 52, for abutting one or more slot covers 101 respectively. A spring tab 57 extends obliquely outwardly and downwardly from each connecting arm 58.

Figure 3:
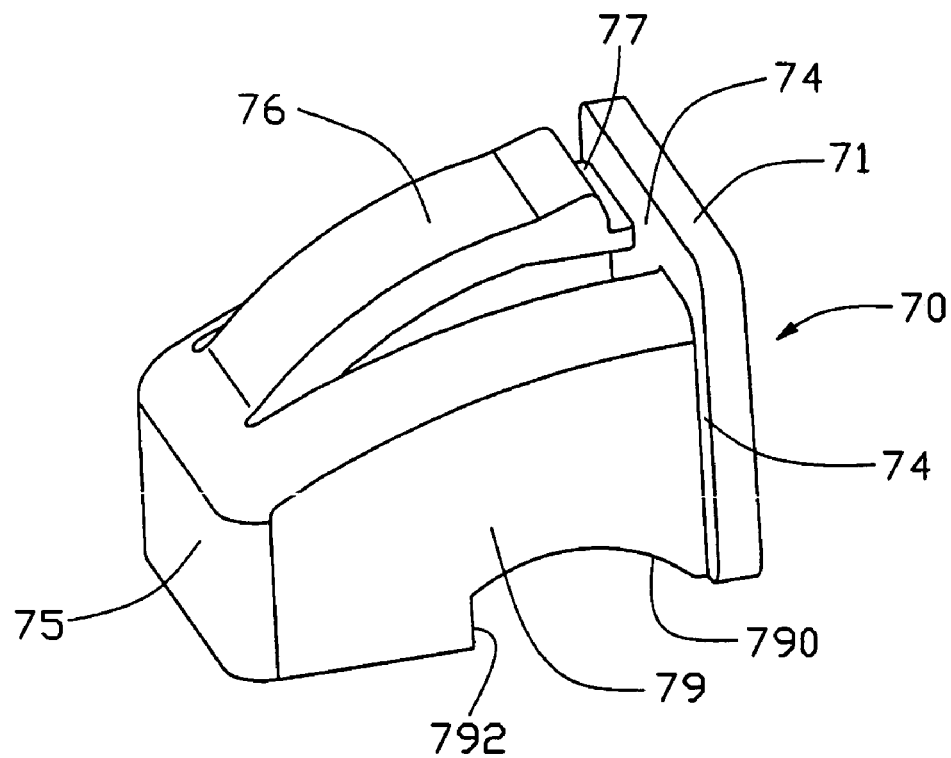
FIG. 3 is an enlarged, isometric view of one of the retention members of the mounting apparatus of FIG. 1, but viewed from a different aspect.
Figure 4:
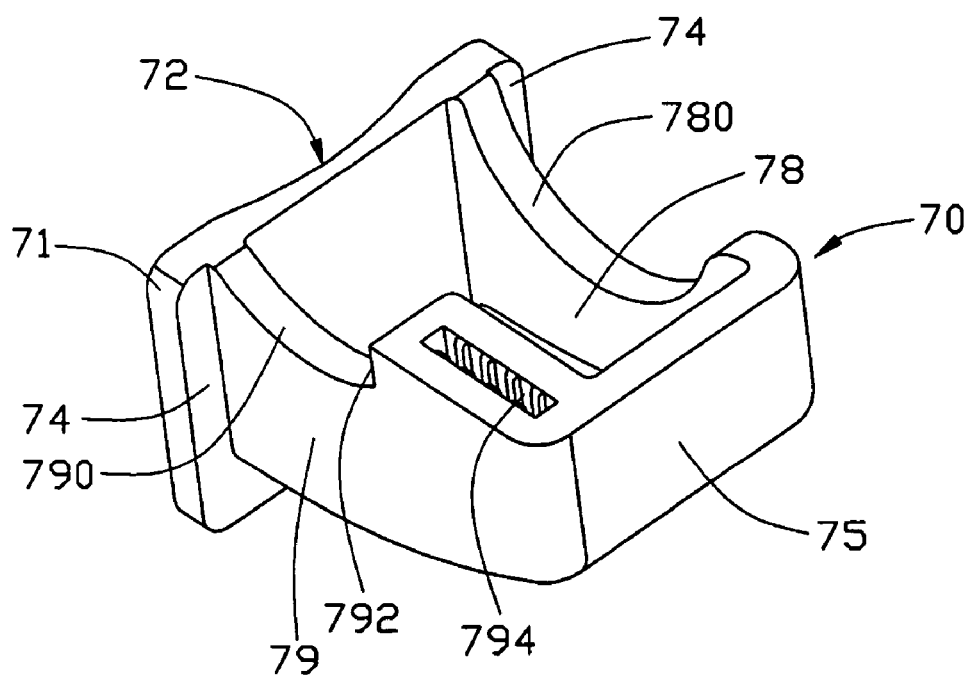
FIG. 4 is similar to FIG. 3, but showing the retention member inverted.

Referring to FIGS. 3 and 4, each retention member 70 comprises generally parallel rear and front plates 71, 75, and two opposite side plates 78, 79 interconnected the rear and front plates 71, 75. A spring arm 76 extends obliquely upwardly and rearwardly from a top side of the front plate 75 generally toward the rear plate 71. The spring arm 76 forms a detent step 77 at a distal end thereof, for engaging with the rear panel 10 at a corresponding retention slot 16. The rear plate 71 comprises a peripheral stop edge portion 74 that protrudes beyond outer extremities of the side plates 78, 79. The stop edge portion 74 is for abutting an outside of the rear panel 10 adjacent the corresponding retention slot 16. The rear plate 71 defines a slightly concave outer operation surface 72. The operation surface 72 may have a plurality of serrated ridges formed thereon, for facilitating operation thereof by a finger of a user. A bottom of the side plate 78 defines a concavity 780, the concavity 780 spanning substantially the full distance between the rear and front plates 71, 75. A bottom rear of the side plate 79 defines a concavity 790. A bottom front of the side plate 79 defines a widened portion. A rearwardly-facing stop wall 792 is defined at a junction of the concavity 790 and the widened portion. The concavities 780, 790 allow the retention member 70 to be freely moved in the retention slot 16. The widened portion defines a connecting hole 794 therein. The connecting hole 794 is for engagingly receiving a corresponding connecting arm 58 of the pressing body 50, thereby connecting the retention member 70 to the pressing body 50. When the connecting arm 58 is received in the connecting hole 794, the spring tab 57 of the connecting arm 58 resiliently abuts against the retention member 70 inside the connecting hole 794, thereby retaining the retention member 70 on the pressing body 50.

Figure 6:
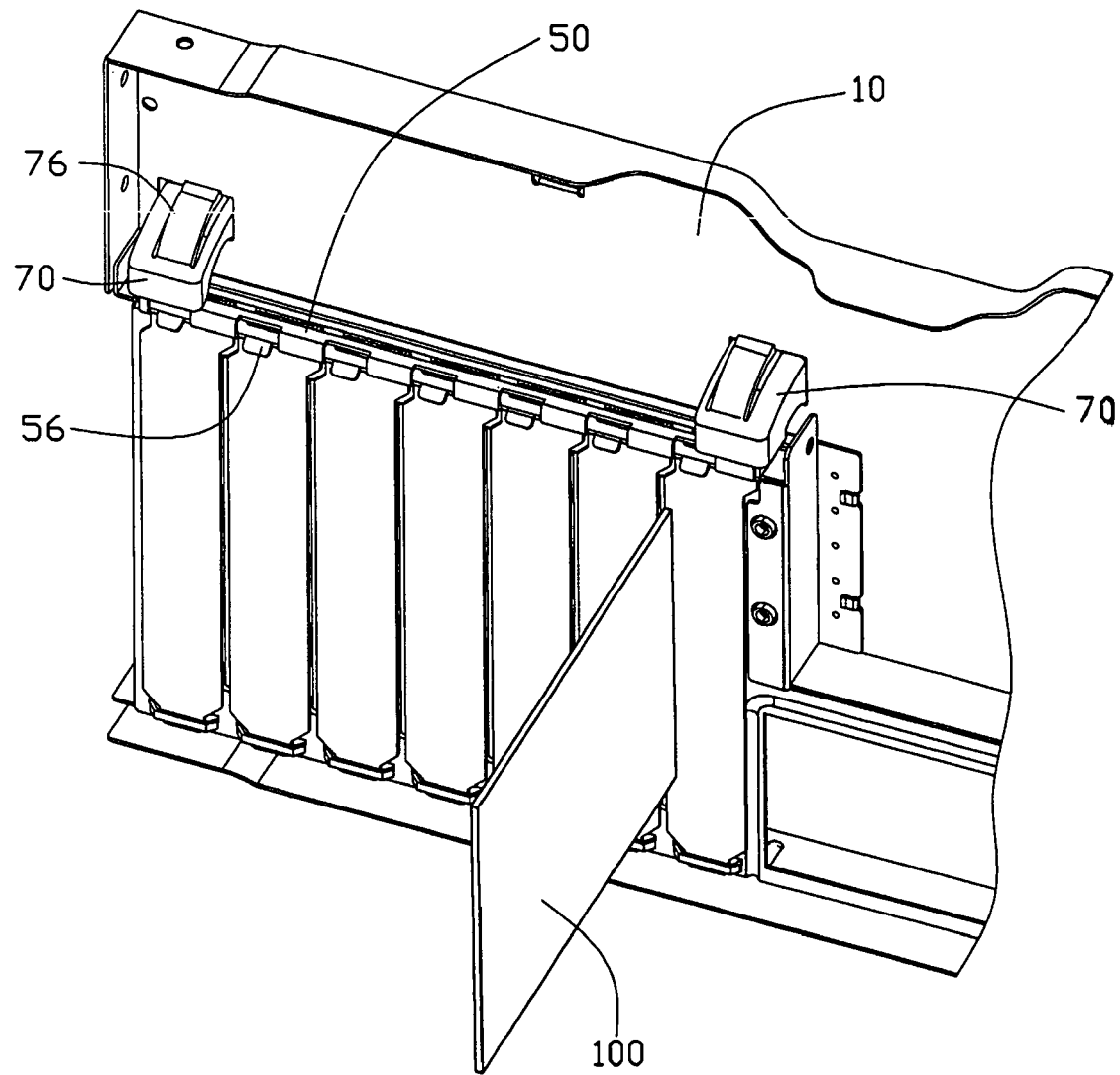
FIG. 6 is similar to FIG. 5, but showing the expansion cards in a locked state.

Referring to FIGS. 5 and 6, in assembly, the notches 360 of the mounting plate 36 of the positioning plate 30 are aligned with the latches 18 of the rear panel 10 respectively. The positioning plate 30 is pushed toward the rear panel 10, so that the notches 360 engagingly receive the latches 18 therein, and the mounting holes 340 of the mounting plate 34 receive the hollow posts 146 of the support frame 12. Thus the positioning plate 30 is attached to the rear panel 10, with the second pivot hole 320 of the connecting plate 32 aligned with the first pivot hole 136 of the upstanding tab 134.

The pivot axles 54 of the pressing body 50 are extended through the first and second pivot holes 136, 320 so that the pressing body 50 is pivotably attached to the support frame 12. The pressing body 50 is pivoted about the pivot axles 54 to enable the connecting arms 58 thereof to extend through the retention slots 16. Each retention member 70 is positioned at the outside of the rear panel 10 adjacent a corresponding retention slot 16, with the connecting hole 794 of the side plate 79 aligned with the corresponding connecting arm 58. The retention member 70 is pushed toward the connecting arm 58, so that the connecting hole 794 engagingly receives the connecting arm 58 therein. Thus, the retention member 70 is connected to and pivotable with the pressing body 50. In this position, the stop wall 792 of the side plate 79 rests on an edge of the rear panel 10 at a bottom side of the retention slot 16. The stop walls 792 of the retention-members 70 thus prevent further downward pivoting of the pressing body 50.

The slot covers 101 of the expansion cards 100 are placed on the support frame 12. The insertion end 108 of each slot cover 101 is received in a corresponding insertion hole 144, and the cutouts 104, 106 of the bent end portion 102 of each slot cover 101 receive a corresponding positioning tab 130 and a corresponding positioning block 132 respectively. Thus, the slot covers 101 are prevented from being moved in horizontal directions.

The operation surfaces 72 of the retention members 70 are pushed upwardly to drive the pressing portion 52 of the pressing body 50 to pivot about the pivot axles 54 toward the slot covers 101. The retention members 70 are slid through the retention slots 16. The spring arms 76 slidingly and resiliently abut against edges of the rear panel 10 at top sides of the retention slots 16. The pressing body 50 is thus pivotingly driven to a locked position, at which the detent steps 77 of the spring arms 76 snappingly engage in the retention slots 16, and the stop edge portions 74 of the retention members 70 abut against the outside of the rear panel 10 adjacent the retention slots 16. The pressing body 50 is thereby retained in the locked position. In the locked position, the spring fingers 55 of the pressing body 50 resiliently press the slot covers 101 downwardly, thereby preventing the slot covers 101 from moving in vertical directions. In addition, the lips 56 of the pressing body 50 press against shoulders of the slot covers 101, thereby further securing the slot covers 101 in place. The slot covers 101 are thus securely attached to the rear panel 10 using the mounting apparatus of the present invention.

To remove the expansion cards 100, the spring arms 76 of the retention members 70 are depressed, so that the detent steps 77 are disengaged from the retention slots 16. The rear plates 71 of the retention members 70 are pulled downwardly so that the pressing portion 52 of the pressing body 50 is pivoted away from the slot covers 101. The pressing body 50 is pivoted until the stop walls 792 of the retention members 70 abut the rear panel 10 at the bottom sides of the retention slots 16. The slot covers 101 are then easily removed from the support frame 12.

In the mounting apparatus of the present invention, the pressing body 50 is pivotably attached to the rear panel 10, and the retention members 70 are demountably attached to the pressing body 50. When installing or removing any one or more of the expansion cards 100, it is not necessary to attach or remove the pressing body 50 or the retention member 70 to or from the rear panel 10. This feature allows quick and convenient installation and removal of the expansion cards 100.

The function of the positioning plate 30 is to provide the second pivot hole 320. The second pivot hole 320 cooperates with the first pivot hole 136 to provide pivotable support for the pressing body 50. Therefore, in alternative embodiments of the present invention, any suitable means that provides the second pivot hole 320 can be employed. For example, a tab defining a second pivot hole may be connected with the right sidewall 15. In another example, a portion of the right sidewall 15 may be stamped upwardly to form a tab similar to the upstanding tab 134.

It is understood that the invention may be embodied in other forms without departing from the spirit thereof. The above-described examples and embodiments are to be considered in all respects as illustrative and not restrictive, and the invention is not to be limited to the details given herein.

The invention claimed is:

1. A mounting apparatus for expansion cards, comprising:
a panel defining two retention slots, and comprising a support member located below the retention slots, the support member adapted for supporting slot covers of the expansion cards;
an elongated pressing body pivotably attached to the panel above the support member; and
two retention members inserted through the corresponding retention slots from outside of the panel to attach to the pressing body and received in the retention slots respectively, the retention members being movable in the retention slots to drive the pressing body between a locked position in which end portions of the slot covers are sandwiched between the support member and the pressing body, and a released position in which the end portions are released from the support member, each of the retention members comprising a spring member snappingly engaging in a corresponding retention slot to retain the pressing body in said locked position.

2. The mounting apparatus as described in claim 1, wherein the pressing body comprises a main pressing portion, and a plurality of evenly spaced spring fingers extends obliquely from the pressing portion, the spring fingers resiliently pressing the end portions of the slot covers when the pressing body is located at said locked position.

3. The mounting apparatus as described in claim 2, wherein the pressing portion comprises a pair of pivot axles at opposite ends thereof respectively, two pivot holes are provided at opposite sides of the support member, the pivot holes pivotably receiving the pivot axles therein respectively.

4. The mounting apparatus as described in claim 1, wherein the pressing body comprises two connecting arms at opposite ends thereof, and each of the retention members defines a connecting hole engagingly receiving a corresponding connecting arm therein.

5. The mounting apparatus as described in claim 4, wherein each of the connecting arms comprises a spring tab extending obliquely therefrom, the spring tab resiliently abutting against the corresponding retention member inside the connecting hole.

6. The mounting apparatus as described in claim 1, wherein each of the retention members comprises front and rear plates, and two opposite side plates interconnecting the front and rear plates.

7. The mounting apparatus as described in claim 6, wherein the spring member extends from the front plate generally toward the rear plate, and comprises a detent step at a distal end thereof, the detent step being snappingly engaged with the panel at a top side of the corresponding retention slot when the pressing body is positioned in said locked position.

8. The mounting apparatus as described in claim 6, wherein the rear plate comprises a peripheral stop portion that protrudes beyond outer extremities of the side plates, the stop portion abutting an outside of the panel adjacent the corresponding retention slot when the pressing body is positioned in said locked position.

9. The mounting apparatus as described in claim 6, wherein each of the side plates defines a concavity at a bottom thereof, the concavities allowing movement of the retention member in the corresponding retention slot.

10. The mounting apparatus as described in claim 9, wherein one of the side plates further comprises a widened portion at the bottom thereof, and a stop wall at a junction of the concavity and the widened portion, the stop wall resting on an edge of the panel at a bottom side of the corresponding retention slot when the pressing body is positioned in said released position.

11. A mounting apparatus for expansion cards, comprising:
a panel defining a retention slot with a support member located below the retention slot, the support member comprising a horizontal portion extending along a first direction, and a vertical portion defining a plurality of expansion slots extending along a second direction perpendicular to said first direction, the expansion slots adapted to receive slot covers of the expansion cards, the panel having a first side an a second side opposite to the first side;
a pressing body pivotably attached to either or both of the support member and the panel and adjacent to the first side of the panel, the pressing body comprising an elongated pressing portion cooperating with the horizontal portion of the support member to sandwich end portions of the slot covers therebetween; and
a retention member inserted through the corresponding retention slot from the second side to the first side of the panel to attach to the pressing body and movably received in the retention slot, the retention member comprising a detent disengagably engaged with the panel to maintain said end portions are in said sandwiched state; wherein
when the detent is disengaged from the panel, the pressing body is pivotable away from the slot covers in order to allow removal of the slot covers.

12. The mounting apparatus as described in claim 11, wherein the retention member comprises front and rear plates, and two opposite side plates interconnecting the front and rear plates, the rear plate being always disposed at an outside of the panel.

13. The mounting apparatus as described in claim 12, wherein a spring arm extends obliquely from the front plate toward the rear plate, and the detent is provided at a free end of the spring arm.

14. The mounting apparatus as described in claim 12, wherein each of the side plates defines a concavity at a bottom thereof, the concavities allowing the movement of the retention member in the retention slot.

15. The mounting apparatus as described in claim 14, wherein one of the side plates further comprises a widened portion at the bottom thereof, and a stop wall at a junction of the concavity and the widened portion, the stop wall being supported on an edge of the panel at a bottom side of the retention slot when the retention member is moved to a bottommost position.

16. The mounting apparatus as described in claim 15, wherein said one of the side plates defines a connecting hole in the widened portion, and the pressing body further comprises a connecting arm engagingly received in the connecting hole.

17. The mounting apparatus as described in claim 16, wherein the connecting arm comprises a spring tab resiliently engaging with the retention member inside the connecting hole.

18. The mounting apparatus as described in claim 12, wherein the rear plate defines an outer concave operation surface, the operation surface having a plurality of serrated ridges formed thereon.

19. The mounting apparatus as described in claim 12, wherein the rear plate comprises a peripheral stop portion that protrudes beyond outer extremities of the side plates, the stop portion abutting the outside of the panel when said end portions are in said sandwiched state.

20. A mounting apparatus comprising:

a panel defining at least one retention slot and a support member located below said retention, said support member comprising a horizontal portion extending along a first direction, and a vertical portion defining a plurality of expansion slots extending along a second direction perpendicular to said first direction, the expansion slots configured to be covered by slot covers of expansion cards, respectively;

a separated positioning plate secured to the panel;

a pressing body pivotably attached to the panel and the positioning plate, the pressing body comprising an elongated pressing portion cooperating with the horizontal portion of the support member to sandwich end portions of the slot covers therebetween; and a retention member being associated with the pressing body via the corresponding retention slot and movably received in the retention slot; wherein the retention member defines a moveable lock which is latchably engaged with the panel so as to hold the slot covers when said pressing body is in a first position, or is disengaged from the panel and moved to an exterior side of the panel through said retention slot so as to release the slot covers when said pressing body is in a second position.

21. The apparatus as described in claim 20, wherein said retention member further includes a plate abutting against an outer surface of the panel when said pressing body is in the first position.

* * * * *